No. 646,486. Patented Apr. 3, 1900.
P. M. BAWTINHIMER.
COMBINED GANG SKIMMER.
(Application filed Nov. 20, 1899.)
(No Model.)
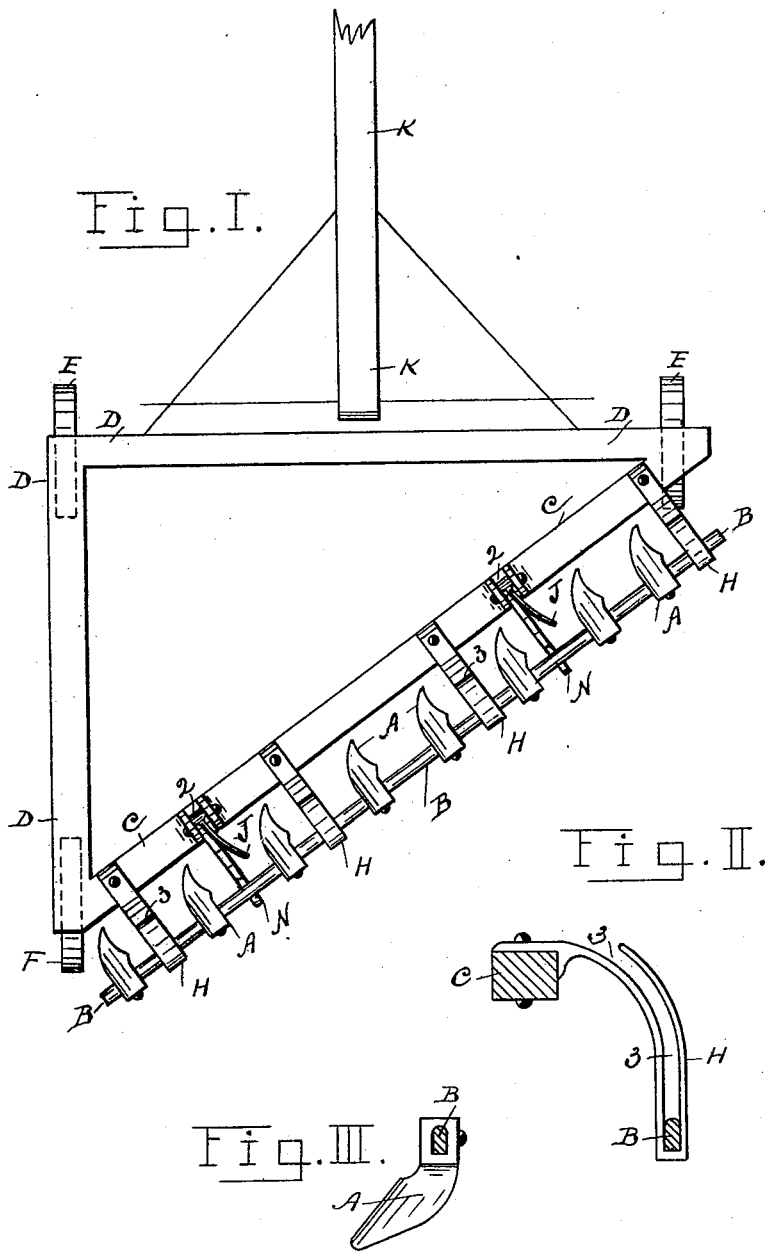
Witnesses
Percy Gomery
Geo Thompson
Inventor
Peter M Bawtinhimer
John K Hendry
Atty.

UNITED STATES PATENT OFFICE.

PETER M. BAWTINHIMER, OF ANCASTER, CANADA.

COMBINED GANG-SKIMMER.

SPECIFICATION forming part of Letters Patent No. 646,486, dated April 3, 1900.

Application filed November 20, 1899. Serial No. 737,636. (No model.)

*To all whom it may concern:*

Be it known that I, PETER M. BAWTINHIMER, a citizen of Canada, residing at the village of Ancaster, in the county of Wentworth and Province of Ontario, Canada, have invented new and useful Improvements in a Combined Gang-Skimmer, (for which I have obtained a patent in Canada, No. 63,989, bearing date September 26, 1899,) of which the following is a specification.

My invention consists of a series of skimmers arranged and attached on a bar which is adjustably connected to the rear oblique part of a frame and parallel therewith; and the objects of my improvements are, first, to provide a machine that is capable of furrowing the top soil in a most efficient manner; second, to provide a series of skimmers arranged obliquely to turn over the top soil in succession in order to form a series of shallow parallel furrows, and, third, to afford facilities for the proper adjustment of the said oblique bar, hence the skimmers in their relation to the framework of the machine, and therefore of the soil in relation to the proper and perfect shallow furrowing of the land. I attain these objects by the mechanism illustrated in the accompanying drawings, in which—

Figure 1 is a plan of the machine, showing the oblique rear part with a series of skimmers in relation on their bar adjusted to the oblique rear part of the frame. Fig. 2 is an enlarged side elevation showing in section the oblique bar in a support attached to the rear oblique part of the framework. Fig. 3 is a side view of a skimmer on the oblique bar.

Similar letters and figures refer to similar parts throughout the several views.

In the drawings the series of skimmers of adaptable form and construction are indicated by A and are suitably attached to a bar B, which is adjustably connected and parallel to the oblique rear part C of the framework D. The framework is supported by wheels E and rear caster-wheel F and drawn by the ordinary means of the front tongue K.

These skimmers A are so arranged and devised in succession on their oblique bar B as to cut a series of small narrow and parallel shallow furrows. The obliquely-arranged bar B is attached to the rear oblique part C of the framework D by means of curved supports H to allow said bar to have vertical and curved adjustment. This adjustment of the bar is accomplished by means of certain hand-levers J and connecting-rods N, which are pivotally connected together at 2 to the said oblique part of the machine. These supports H have openings 3, in which rests the bar B, which may be raised a certain height and brought toward the frame part C and parallel therewith by means of the said connecting-rods N and the hand-levers J. The rear parts of these rods N pass underneath the bar B in order to lift said bar more easily. Also the bar, with its skimmers, may be removed from the supports H without unfastening any part of the machine. The skimmers are capable of being adjusted longitudinally on their bar.

Various changes in the form, proportion, and minor details of my invention may be resorted to without departing from the spirit and scope thereof. Hence

What I claim as my invention, and desire to secure by Letters Patent, is—

1. A machine of the character described, comprising a series of skimmers arranged on an oblique bar attached to and capable of longitudinal adjustment on the rear oblique framework of the machine as described.

2. A machine of the character described, comprising a series of skimmers arranged on an oblique bar and capable of longitudinal adjustment thereon and the said bar capable of vertical adjustment.

In testimony whereof I affix my signature in presence of two witnesses.

PETER M. BAWTINHIMER.

Witnesses:
JOHN H. HENDRY,
CHAS. GENTLE.